US010659408B2

(12) United States Patent
Wang et al.

(10) Patent No.: US 10,659,408 B2
(45) Date of Patent: May 19, 2020

(54) MEDIA INFORMATION RELEASE METHOD, SYSTEM, AND COMPUTER STORAGE MEDIUM

(71) Applicant: Tencent Technology (Shenzhen) Company Limited, Shenzhen (CN)

(72) Inventors: Fa Wang, Shenzhen (CN); Yunnan Zhou, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 0 days.

(21) Appl. No.: 16/045,480

(22) Filed: Jul. 25, 2018

(65) Prior Publication Data

US 2018/0331986 A1 Nov. 15, 2018

Related U.S. Application Data

(63) Continuation-in-part of application No. PCT/CN2017/074180, filed on Feb. 20, 2017.

(30) Foreign Application Priority Data

Feb. 19, 2016 (CN) .......................... 2016 1 0095328

(51) Int. Cl.
*G06Q 20/10* (2012.01)
*G06Q 20/08* (2012.01)
*H04L 12/58* (2006.01)

(52) U.S. Cl.
CPC ............ *H04L 51/10* (2013.01); *H04L 51/046* (2013.01); *H04L 51/08* (2013.01); *H04L 51/18* (2013.01); *H04L 51/24* (2013.01)

(58) Field of Classification Search
CPC ............ G06F 17/2765; G06F 3/04817; G06F 3/0486; H04L 67/02; H04L 67/10;
(Continued)

(56) References Cited

U.S. PATENT DOCUMENTS 10,192,218 B2 * 1/2019 Chen ...................... G06Q 20/12
2007/0033255 A1 * 2/2007 Sanjeeva ................. G06F 15/16
709/206
(Continued)

FOREIGN PATENT DOCUMENTS

| CN | 103051516 A | 4/2013 |
| CN | 104239027 A | 12/2014 |
| CN | 105117228 A | 12/2015 |

OTHER PUBLICATIONS

Tencent Technology, ISRWO, PCT/CN2017/074180, May 26, 2017, 7 pgs.
(Continued)

*Primary Examiner* — Backhean Tiv
*Assistant Examiner* — Linh T. Nguyen
(74) *Attorney, Agent, or Firm* — Morgan, Lewis & Bockius LLP

(57) ABSTRACT

The present disclosure relates to a media information releasing method performed by a mobile terminal. The mobile terminal receives a media information releasing message associated with a second application while running a first application. The mobile terminal generates a media information releasing message interface corresponding to the media information releasing message, the media information releasing message including a corresponding media information releasing configuration, and then presents, by using a floating window, the media information releasing message interface on a current display interface of the first application. After obtaining a first user operation performed on the media information releasing message interface, the mobile terminal submits a media information obtaining request associated with the second application to a remote server, so that the server shares media information according to the
(Continued)

media information releasing configuration, thereby improving media information obtaining efficiency.

14 Claims, 11 Drawing Sheets

(58) Field of Classification Search
CPC ..... H04L 51/10; H04L 67/2823; H04L 51/36; H04L 63/10; H04L 67/125; H04L 51/32; H04L 51/04; H04L 51/046; H04L 51/066; H04L 51/12; G06Q 20/00; G06Q 20/3224; G06Q 30/0601; G06Q 30/0635
USPC .......................................... 709/203, 219, 227
See application file for complete search history.

(56) References Cited

U.S. PATENT DOCUMENTS

| | | | |
|---|---|---|---|
| 2010/0058171 A1* | 3/2010 | Tsai | H04L 67/02 715/234 |
| 2012/0143761 A1* | 6/2012 | Doran | G06Q 20/08 705/44 |
| 2012/0191525 A1* | 7/2012 | Singh | G06Q 30/0226 705/14.33 |
| 2013/0318429 A1* | 11/2013 | Dantas | G06F 3/048 715/234 |
| 2016/0071194 A1* | 3/2016 | Proulx | G06Q 30/0641 705/26.8 |
| 2016/0104133 A1* | 4/2016 | Davis | G06Q 20/10 705/39 |
| 2016/0171481 A1* | 6/2016 | McElmurry, IV | G06Q 20/32 705/39 |
| 2016/0342571 A1* | 11/2016 | Lane | G06F 17/212 |
| 2019/0026212 A1* | 1/2019 | Verkasalo | G06F 11/3438 |
| 2019/0266587 A1* | 8/2019 | Lin | G06Q 20/223 |

OTHER PUBLICATIONS

Tencent Technology, IPRP, PCT/CN2017/074180, Aug. 21, 2018, 5 pgs.

* cited by examiner

MEDIA INFORMATION RELEASE METHOD, SYSTEM, AND COMPUTER STORAGE MEDIUM

PRIORITY CLAIM AND RELATED APPLICATION

This application is a continuation-in-part application of PCT/CN2017/074180, entitled "METHOD AND APPARATUS FOR SHARING RESOURCES" filed on Feb. 20, 2017, which claims priority to Chinese Patent Application No. 201610095328.5, filed with the State Intellectual Property Office of the People's Republic of China on Feb. 19, 2016, and entitled "METHOD AND APPARATUS FOR SHARING RESOURCES", all of which are incorporated herein by reference in their entirety.

FIELD OF THE TECHNOLOGY

The present disclosure relates to the field of computer technologies, and in particular, to a media information releasing method and apparatus.

BACKGROUND OF THE DISCLOSURE

With the development of computer technologies, people not only can share resources in an off-line manner, but also can share resources by using a network. Shared resources include, but are not limited to, virtual red packets, electronic coupons, bonus point coupons, bonus points, electronic vouchers, game currencies, and virtual objects.

In a conventional media information releasing method, a source application client of a resource message usually needs to be enabled, and a speed for enabling the client depends on a response speed of a machine. This reduces a possibility that a user obtains a resource through scrambling, when resources are limited. In addition, a resource message is usually mixed with common messages. Consequently, the resource message is buried in the common messages, and the user misses the resource, greatly limiting media information obtaining efficiency.

SUMMARY

In view of this, it is necessary to provide a media information releasing method and apparatus for the foregoing technical problem, to improve media information obtaining efficiency.

According to a first aspect of the present application, a media information releasing method is performed at a mobile terminal having one or more processors and memory storing a plurality of programs to be executed by the one or more processors, the method comprising:
  receiving a media information releasing message while running a first application at the mobile terminal, the media information releasing message being associated with a second application distinct from the first application;
  determining whether the first application enables rendering the media information releasing message;
  in accordance with a determination that the first application enables rendering the media information releasing message:
    generating a media information releasing message interface corresponding to the media information releasing message, the media information releasing message comprising at least a media information releasing configuration;
    presenting, by using a floating window, the media information releasing message interface on a current display interface of the first application;
    obtaining a first user operation performed on the media information releasing message interface; and
    in response to the first user operation, submitting a media information obtaining request associated with the second application to a remote server, wherein the server is configured to share media information according to the media information releasing configuration.
  In some embodiments, the method further comprises:
  in accordance with a determination that the application does not enable rendering the media information releasing message:
    generating a system notification of the second application for the media information releasing message; and
    presenting a visual indicator corresponding to the system notification on the current display interface of the first application;
    obtaining a second user operation performed on the visual indicator; and
    in response to the second user operation, replacing the current display interface of the first application with a system notification interface including the system notification for the media information releasing message.

According to a second aspect of the present application, a mobile terminal is used for media information releasing, the mobile terminal comprising one or more processors, memory coupled to the one or more processors, and a plurality of programs stored in the memory that, when executed by the one or more processors, cause the mobile terminal to perform the aforementioned method.

According to a third aspect of the present application, a non-transitory computer readable storage medium stores a plurality of programs that, when executed by one or more processors of a mobile terminal, cause the mobile terminal to perform the aforementioned method.

According to the media information releasing method and apparatus, a media information releasing message is received, and a media information releasing message interface corresponding to the media information releasing message is generated, where the media information releasing message includes a corresponding media information releasing configuration. The media information releasing message interface is presented on a current display interface by using a floating window. By means of presentation by using the floating window, a media information receiver can be reminded in a timely and conspicuous manner, and the user does not need to autonomously search a receiving box of an application that receives a resource message and a non-resource message in a mixed manner for the resource message. A first user operation performed on the media information releasing message interface is obtained, where the first operation triggers a media information obtaining request, so that a server shares media information according to the media information releasing configuration. The media information obtaining request can be directly triggered on the current display interface to perform media information releasing, and a source application client of the resource message does not need to be enabled. The operations are simple and convenient, improving media information obtaining efficiency.

DESCRIPTION OF EMBODIMENTS

Figure 1:
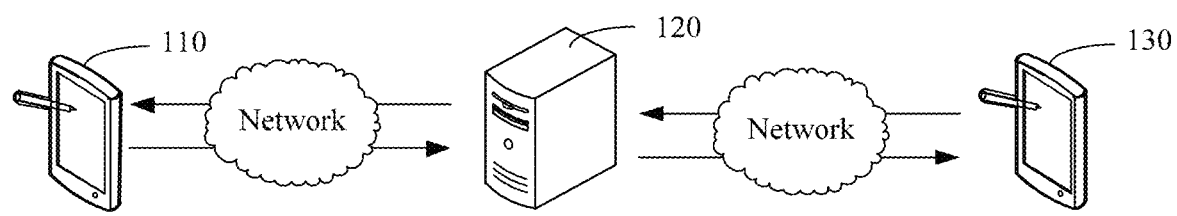
FIG. 1 is a diagram of an application environment of a media information releasing method according to some embodiments of the present application.

FIG. 1 is a diagram of an application environment in which a media information releasing method is used according to some embodiments of the present application. As shown in FIG. 1, the application environment includes a terminal 110, a server 120, and a terminal 130, where the terminal 110 and the terminal 130 communicate with the server 120 by using a network.

The terminal 110 and the terminal 130 may be a mobile terminal such as smartphones, tablet computers, notebook computers, desktop computers, or the like, but are not limited thereto. The terminal 130 sends a media information releasing request to the server 120 by using the network, and the server 120 sends a media information releasing message to the terminal 110 according to the media information releasing request. The terminal 110 sends a request to the server 120 by using the network, for example, a media information obtaining request, and the server 120 may respond to the request sent by the terminal 110. The server may be a single server, or a server cluster.

Figure 2:
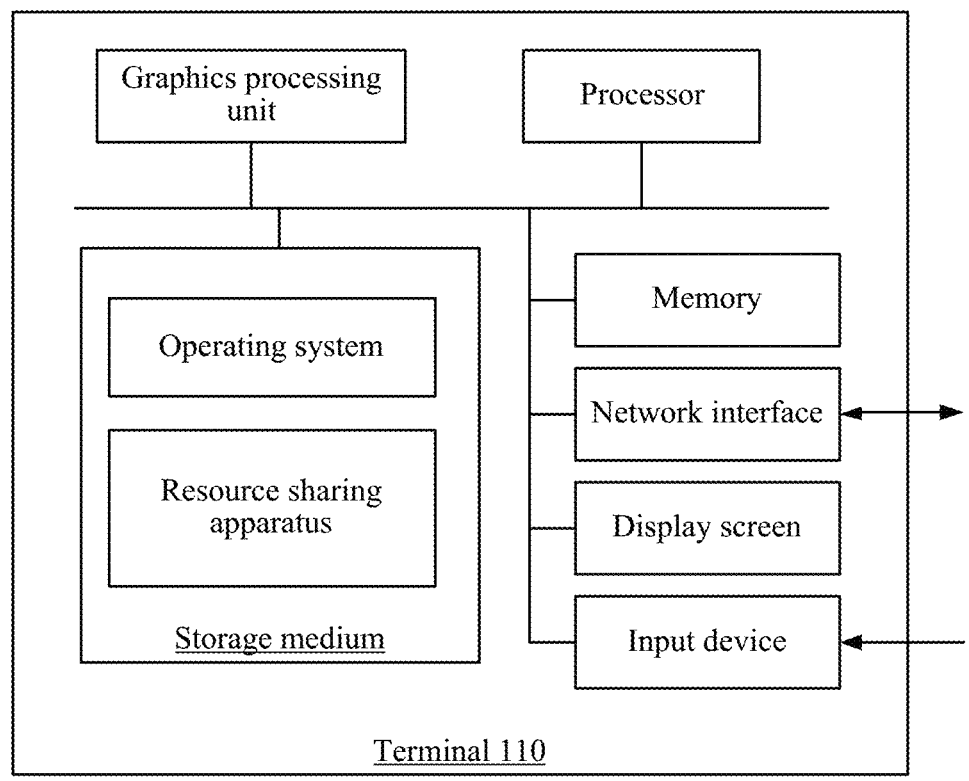
FIG. 2 is a diagram of an internal structure of a terminal 110 in FIG. 1 according to some embodiments of the present application.

In an embodiment, an internal structure of the terminal 110 in FIG. 1 is shown in FIG. 2. The terminal 110 includes a processor, a graphics processing unit, a storage medium, a memory, a network interface, a display screen, and an input device that are connected to each other by using a system bus. The storage medium of the terminal 110 stores an operating system, and further includes a media information releasing apparatus. The apparatus is configured to implement a media information releasing method applicable to the terminal. The processor is configured to provide computing and control capabilities, to support running of the entire terminal 110. The graphics processing unit in the terminal 110 is configured to provide at least a drawing capability of a display interface. The memory provides an environment for running of an apparatus for controlling an application in the storage medium. The network interface is configured to perform network communication with the server 120, for example, send a media information obtaining request to the server 120, and receive a message returned by the server 120. The display screen is configured to display an application interface and the like, for example, display media information obtaining details. The input device is configured to receive a command, data, or the like entered by a user. The terminal 110 has a touchscreen, and the display screen and the input device may be the touchscreen.

Figure 3:
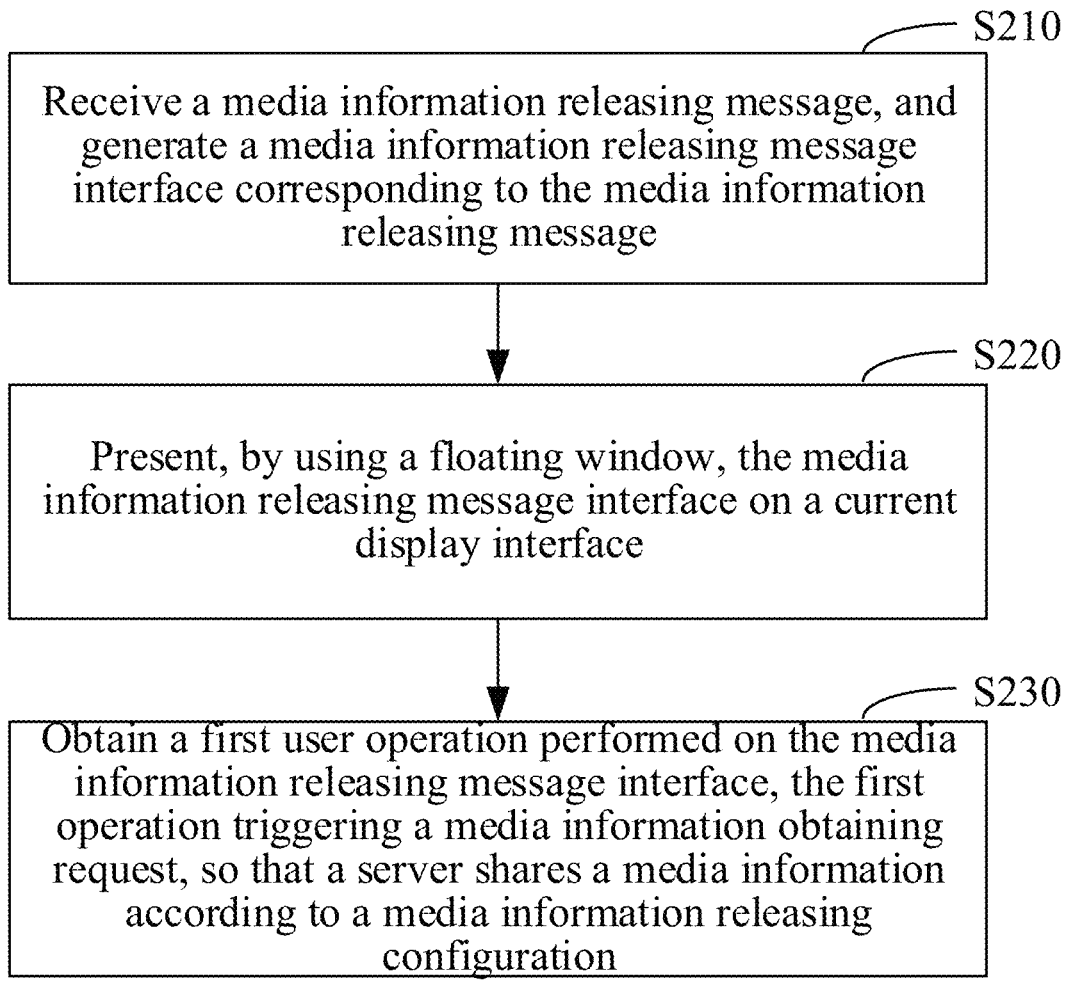
FIG. 3 is a flowchart of a media information releasing method according to some embodiments of the present application.

In an embodiment, as shown in FIG. 3, a media information releasing method is provided. An example in which the method is applied to the terminal 110 in the foregoing application environment is used for description, and the method includes the following steps:

Step S210: Receive a media information releasing message, and generate a media information releasing message interface corresponding to the media information releasing message, the media information releasing message including at least a media information releasing configuration.

In some embodiments, the terminal 110 receives the media information releasing message while running a first application (e.g., a web browser application) and the media information releasing message is associated with a second application distinct from the first application, e.g., an instant messaging application. Typically, the terminal 110 ranks different applications running at the terminal by their importance relative to the user of the terminal. For example, an instant messaging application is deemed to be usually more important than the web browsing application such that the terminal may switch from the web browsing application to the instant messaging application whenever there is a new instant message arriving at the terminal. A problem with this approach is that not all the instant messages are at the same importance level. Some instant messages are time-sensitive while others might not. If the web browser application is always disrupted by the new instant message associated with the instant messaging application, the user experience with the web browser application will be adversely affected. The present application is directed to an approach that overcomes the deficiencies of the conventional approaches that either present all the incoming instant messages as an alert or notification in the background or bring them to the foreground to cover the web browser application, both of which reduce the efficiency of using the limited space of the terminal 110 (especially in case that the terminal 110 is a mobile terminal).

In this application, the terminal 110 is enabled to specify what type of instant messages can be rendered on the screen while the terminal 110 is running the web browser application and what type of instant messages cannot be rendered on the screen while the terminal 110 is running the web browser application. For example, a time-sensitive media information releasing message (e.g., claiming a gift package or promoting tickets to a particular event) that has a short time window for immediate participation by the user would be rendered while the terminal 110 is running the web browser application. Conversely, a generic, not-time-sensitive media information releasing message (e.g., a picture posted by a friend on his/her social networking application) may be only presented in the form of a system notification message. To achieve this feature, the terminal 110 first determines whether the web browser application enables rendering the media information releasing message or not. If true, the terminal 110 then generates a media information releasing message interface corresponding to the media information releasing message, the media information releasing message comprising at least a media information releasing configuration; otherwise, the terminal 110 generates a system notification of the instant messaging application for the media information releasing message and presents a visual indicator corresponding to the system notification on the current display interface of the web browser application. After obtaining a second user operation performed on the visual indicator, the terminal 110 replaces the current display interface of the first application with a system notification interface including the system notification for the media information releasing message.

In some embodiments, the terminal 110 then obtains a third user operation performed on the system notification for the media information releasing message and then renders the media information releasing message in its native application (i.e., the instant messaging application). In response to a fourth user operation performed on the media information releasing message rendered in the native application, the terminal 110 submits the media information obtaining request associated with the second application to the remote server.

Specifically, the media information releasing message is a message that is generated after a media information releasing initiator shares media information (e.g., a gift package or a ticket to an event), and may include basic information of the media information, basic information of a media information releasing initiator, basic information of a media information receiver, and the like.

The basic information of the media information includes a media information identifier, a sharing password, an instant messaging identifier, an expiration time of the media information, and the like. The basic information of the media information releasing initiator includes a user identifier of the media information releasing initiator, a friendship, and the like.

The basic information of the media information receiver includes a group identifier, a user identifier of the media information receiver, a friendship, and the like. The media information releasing initiator may initiate media information releasing by using media information management software, instant messaging software, social software, or the like, and specify a receiver of the media information releasing message. For example, a fixed user is specified as the receiver, or the media information receiver is not specifically specified by using a group or a discussion group, and only the quantity of receivers is specified, so that members in the group or in the discussion group can scramble for the media information.

Figure 7:
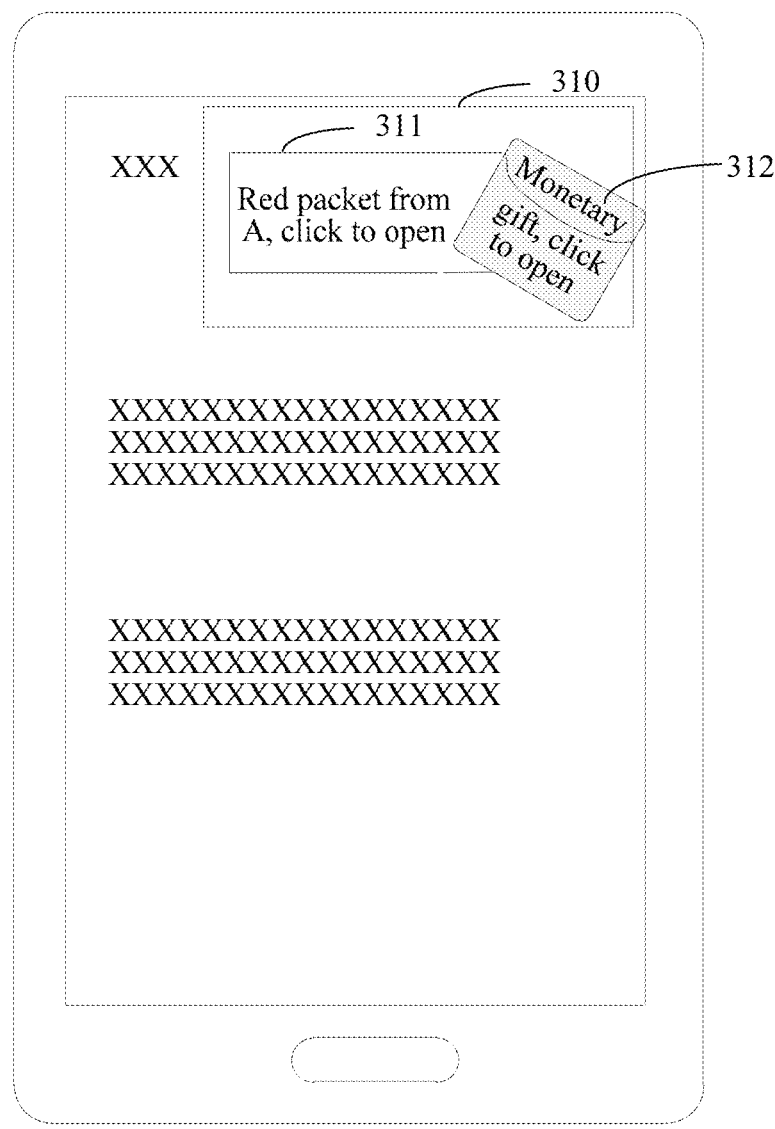
FIG. 7 is a schematic diagram of a media information releasing message interface presented by using a floating window according to some embodiments of the present application.

The media information releasing message interface corresponding to the media information releasing message may be generated according to the basic information of the media information, the basic information of the media information releasing initiator, the basic information of the receiver, and the like. A name of the media information releasing initiator, introduction information of the media information, and the like are displayed on the interface. A form of the interface may be customized. For example, the color, the size, the background, the pattern, or the like is customized. FIG. 7 shows a red packet sharing message interface 310 corresponding to a gift package, where the red packet sharing message interface 310 includes introduction information 311 of the red packet and a red packet cover 312.

The media information releasing configuration is a configuration of a presentation manner of the media information, sharing rules, the quantity of media information, and the like, and may be set by the media information releasing initiator in advance. An association relationship between the media information releasing configuration and the media information identifier is established, and is stored in the server, so that the server obtains the corresponding media information releasing configuration according to the media information identifier. The presentation manner of the media information includes the presentation color and size of a media information body corresponding to the media information, a presentation location, and the like. The sharing rules include equal allocation, random allocation, the quantity of allocated persons, and the like.

In an embodiment, step S210 includes: receiving a message, obtaining a type identifier of the message, determining whether the type identifier is a media information releasing type, and if yes, determining that the received message is a media information releasing message.

Specifically, each media information releasing message sent by a media information sharer to the server carries a type identifier of the message. For example, the media information releasing message is identified by using a preset character of a preset field, and the type is divided into a media information type and a non-media information type. The server delivers the media information releasing message to the terminal of the media information receiver, and the terminal extracts the message type identifier from the media information releasing message. If the type identifier indicates a media information releasing type, the received message is a media information releasing message.

Step S220: Present, by using a floating window, the media information releasing message interface on a current display interface.

Specifically, the media information releasing message interface is presented on a current application by using the floating window. The current application may be an application that is currently operated or all current applications. By means of presentation by using the floating window, the media information receiver may be reminded in a timely and conspicuous manner, and the user does not need to autonomously search a receiving box of an application that receives a media information message and a non-media information message in a mixed manner for the media information message, thereby improving media information obtaining efficiency. When a system provides a floating window interface, the floating window interface provided by the system may be directly invoked. Content or an identifier of the media information releasing message interface is transmitted to the media information releasing message interface for presentation by using the floating window. Presentation parameters of the floating window may be customized as needed, for example, a presentation location, presentation animation, and mobility. The floating window is presented on the current display interface without the need to enable a source application of the media information releasing message, so that obtaining of the media information cannot be affected by a capability and speed of the terminal. The user may easily scramble for the media information while browsing a web page, reading news, or consuming any other content, to implement fast multi-task switching.

Step S230: Obtain a first user operation performed on the media information releasing message interface, the first operation triggering a media information obtaining request, so that a server shares media information according to the media information releasing configuration.

Specifically, the first operation may be a mouse click, a touch operation on a touchscreen, or the like. When the first operation is detected, the media information obtaining request is generated. The media information obtaining request may include the media information identifier, an identifier of the media information receiver, a time corresponding to the first operation, and the like, so that the server obtains the corresponding media information releasing configuration according to the media information identifier, and shares the media information according to the media information releasing configuration. When there are multiple media information receivers, the server may further determine a final media information receiver according to a sequence of time for performing first operations. The identifier of the media information receiver is used for returning the shared media information, verification of media information receiving permission, and the like. By means of the first user operation performed on the media information releasing message interface, the media information obtaining request may be directly triggered to share the media information without the need to enable a source application client of a media information message. The operations are simple and convenient, improving the media information obtaining speed.

The media information obtaining request may be generated by using a payment plug-in of the terminal. When the first operation is detected, the payment plug-in obtains the identifier of the media information receiver, for example, an account number of a user scrambling for a monetary gift, and an identifier of a media information releasing message, for example, a monetary gift identifier of a monetary gift sharing message. The payment plug-in combines such information to generate the media information obtaining request, and sends the media information obtaining request to the server. The server obtains, according to such information and the media information releasing configuration, the quantity of media information scrambled by the user of the account number from the monetary gift, and returns media information releasing result information to the payment plug-in. Then, the payment plug-in opens a window of the monetary gift.

In this embodiment, a media information releasing message is received, and a media information releasing message interface corresponding to the media information releasing message is generated, where the media information releasing message includes a corresponding media information releasing configuration. The media information releasing message interface is presented on a current display interface by using a floating window. By means of presentation by using the floating window, a media information receiver can be reminded in a timely and conspicuous manner, and the user does not need to autonomously search a receiving box of an application that receives a media information message and a non-media information message in a mixed manner for the media information message. A first user operation performed on the media information releasing message interface is obtained, where the first operation triggers a media information obtaining request, so that a server shares media information according to the media information releasing configuration. The media information obtaining request can be directly triggered on the current display interface to perform media information releasing, and a source application client of the media information message does not need to be enabled. The operations are simple and convenient, improving media information obtaining efficiency.

In an embodiment, the media information releasing message is received by using a chat interface of a first application. The first application includes an instant messaging application and/or a social application.

Specifically, the chat interface may be an interface of two users chatting alone or a chat interface of a group, a discussion group, or the like. The media information releasing message is received by using the chat interface, so that media information releasing is implemented during communication, to facilitate media information obtaining by a user during flexible communication, for example, scrambling for the monetary gift, thereby increasing the level of activity of the media information releasing.

Figure 4:
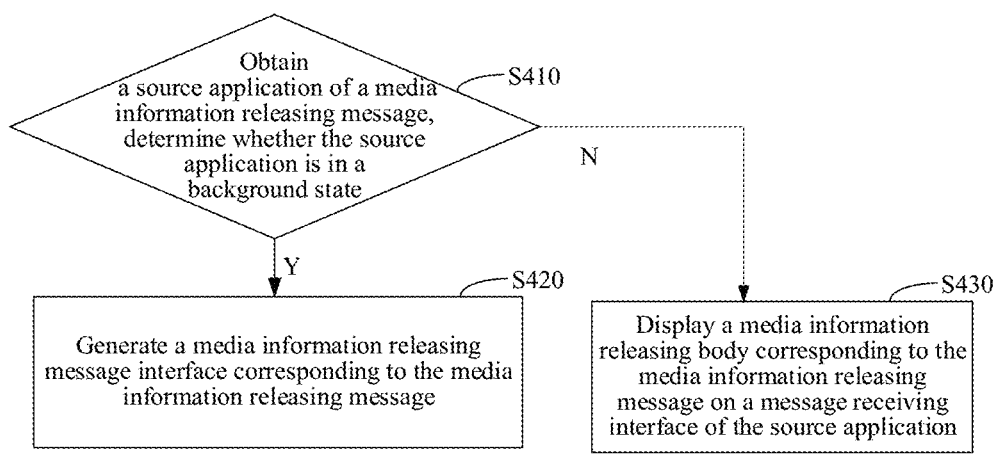
FIG. 4 is a flowchart for generating a media information releasing message interface according to a status of a source application according to some embodiments of the present application.

In an embodiment, as shown in FIG. 4, after the operation of receiving a media information releasing message, the method further includes:

Step S410: Obtain a source application of the media information releasing message, determine whether the source application is in a background state, and if yes, perform step S420, or if not, perform step S430.

Specifically, the source application of the media information releasing message is an application receiving the media information releasing message, for example, an instant messaging application or a social application. If the source application of the media information releasing message is in the background state, it indicates that an application that is current operated by the user is not the source application. If a media information body corresponding to the media information message is presented in the source application, the user may not see the media information body. Therefore, step S420 is performed, to first generate the corresponding interface, and then the user can be notified in a timely manner by means of presentation by using the floating window.

In an embodiment, if the source application is in a foreground state, whether the source application is on a non-message receiving interface further needs to be determined, and if yes, step S420 is performed, or if not, step S430 is performed.

Specifically, a tag column includes a message tag column, a contact tag column, a status tag column, and the like. One of the tags may be clicked, to switch to a corresponding interface. An interface corresponding to the message tag column is a message receiving interface, an interface corresponding to the contact tag column is a contact interface, and an interface corresponding to the status tag column is a friend status interface. If the source application is on the non-message receiving interface, the user may not see the media information message. Therefore, step S420 is performed, to first generate the corresponding interface, and then the user can be notified in a timely manner by means of presentation by using the floating window, thereby further extending a range of conditions for presentation by using the floating window, facilitating reminding the user.

Step S420: Generate a media information releasing message interface corresponding to the media information releasing message.

Step S430: Display a media information releasing body corresponding to the media information releasing message on a message receiving interface of the source application.

Specifically, if the source application is in the foreground state, the user is currently operating the source application. The media information releasing body corresponding to the media information releasing message may be directly displayed on the message receiving interface of the source application, to facilitate direct viewing by the user in the source application.

Figure 5:
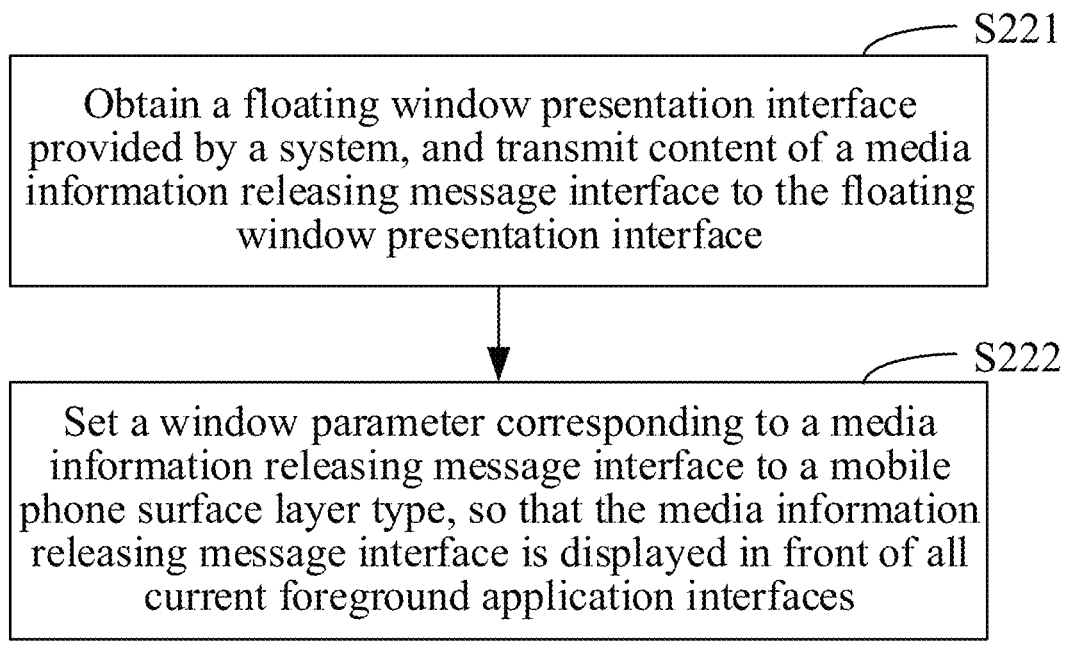
FIG. 5 is a flowchart for presenting a media information releasing message interface by using a floating window according to some embodiments of the present application.

In an embodiment, as shown in FIG. 5, step S220 includes:

Step S221: Obtain a floating window presentation interface provided by a system, and transmit content of the media information releasing message interface to the floating window presentation interface.

Specifically, the floating window presentation interface is an interface in which a presentation program of the floating window is implemented. Only the interface needs to be invoked and only content to be presented needs to be transmitted, to implement presentation of corresponding content by using the floating window. For an Android system, the floating window presentation interface is a WindowManager function. The function is an interface provided by Android, and the media information releasing message interface is displayed by using the floating window and by using a WindowManager.addView(View, WindowManager.layoutparams) method. The parameter View refers to content of the media information releasing message interface. Presentation of the floating window is implemented by using an interface provided by the system, and this is simple and convenient. For a terminal of a customized system, if permission to use the floating window needs to be manually enabled, the user is reminded to enable the permission on the floating window.

Step S222: Set a window parameter corresponding to the media information releasing message interface to a mobile phone surface layer type, so that the media information releasing message interface is displayed in front of all current foreground application interfaces.

Specifically, there are different methods for presenting the floating window. For example, the floating window is presented on an interface of an application that is currently operated, or presented in front of interfaces of all applications. The window parameter corresponding to the media information releasing message interface is set to the mobile phone surface layer type, so that the media information releasing message interface can be displayed in front of all current foreground application interfaces, and is displayed more conspicuously.

Figure 6:
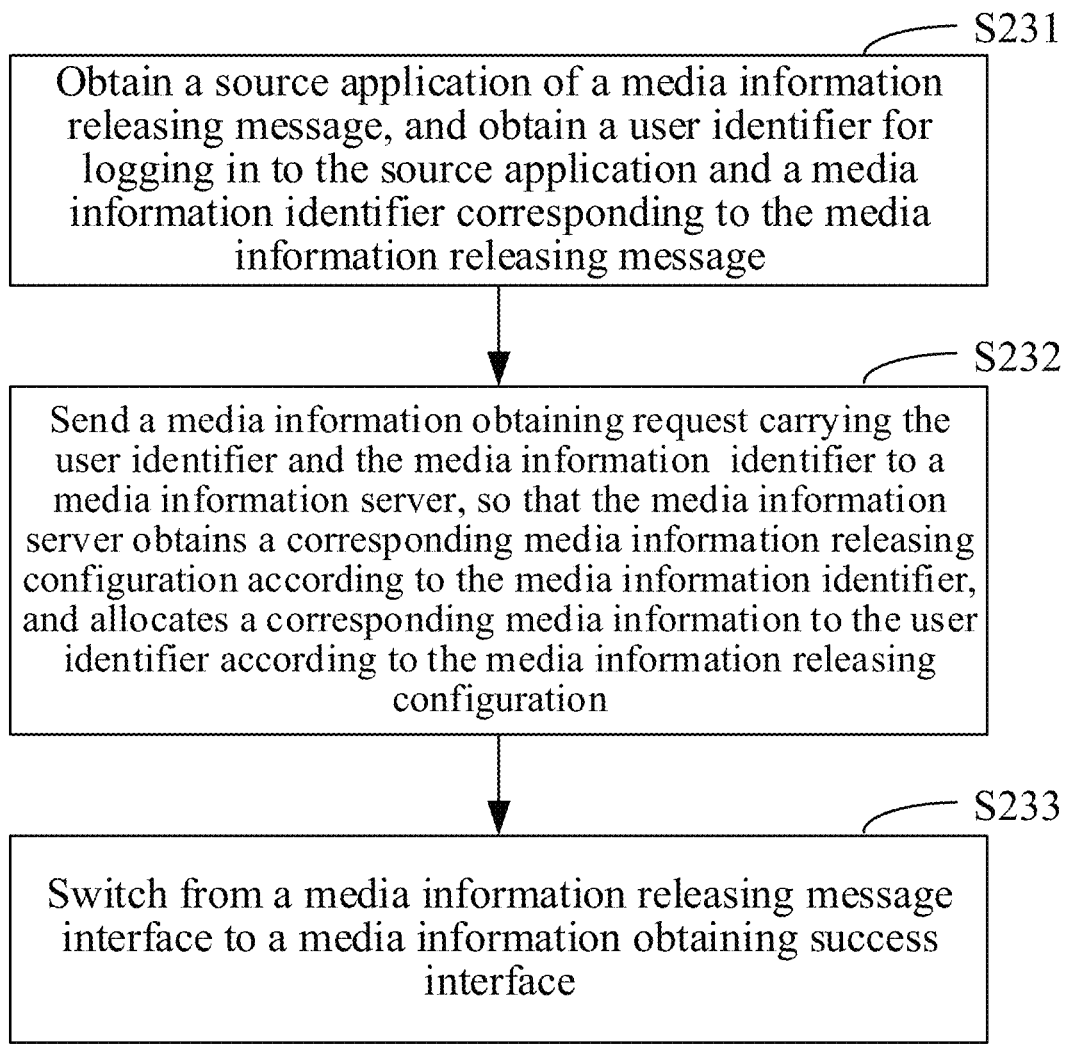
FIG. 6 is a flowchart for obtaining media information according to some embodiments of the present application.

In an embodiment, as shown in FIG. 6, step S230 includes:

Step S231: Obtain a source application of the media information releasing message, and obtain a user identifier for logging in to the source application and a media information identifier corresponding to the media information releasing message.

Specifically, the user identifier is used for uniquely identifying a user, and may be, for example, a user name, or a user number. The media information identifier is used for uniquely identifying a media information.

Step S232: Send a media information obtaining request carrying the user identifier and the media information identifier to a media information server, so that the media information server obtains a corresponding media information releasing configuration according to the media information identifier, and allocates a corresponding media information to the user identifier according to the media information releasing configuration.

Specifically, the media information identifier and the corresponding media information releasing configuration are stored in the media information server in advance. After receiving the media information obtaining request, the server may obtain the corresponding media information releasing configuration by extracting the media information identifier from the media information obtaining request, and then allocates the media information according to the media information releasing configuration. After the media information is successfully allocated, the shared media information enters an account corresponding to the user identifier, for example, an eWallet.

Step S233: Switch from the media information releasing message interface to a media information obtaining success interface.

Specifically, the media information obtaining success interface may display a size of a media information currently obtained by the user, a name of a media information sharer, and the like. The media information obtaining success interface may further include an entry of an interface of media information releasing result details. Details of the obtained media information may be viewed by clicking the entry of the interface of media information releasing result details. If the media information is shared by many people, details of the media information obtained by other users or the like may be viewed.

In an embodiment, after step S230, the method further includes: obtaining a second operation performed on a media information releasing information entry of the media information obtaining success interface, so that the source application is switched to a foreground, and displaying media information releasing information on the source application.

Specifically, the media information releasing information is details of the media information releasing, including a total amount of media information, sizes of media information obtained by all media information obtainers, a time for obtaining the media information, and the like.

The second operation may be a mouse click, a touch operation on a touchscreen, or the like. When the second operation is detected, the source application is switched to the foreground, and the media information releasing information is displayed on the source application. The source application is switched to the foreground, to automatically enable a client of the source application, so that a user that has obtained the media information though scrambling views details of the media information obtaining on the source application, and performs communication.

In a specific embodiment, the media information is an electronic monetary gift, the media information releasing information is received by using a group chat interface of an instant messaging application, the media information releasing is a multi-person media information releasing with a limited quantity, and a specific process of the media information releasing method is as follows:

1. As shown in FIG. 7, the current interface is a web page browsing interface, a monetary gift sharing message received by an instant messaging client slides out from the right side of the current interface in a form of floating notification by a red floating window, and a monetary gift sharing message interface 310 is displayed in front of all current applications.

Figure 8:
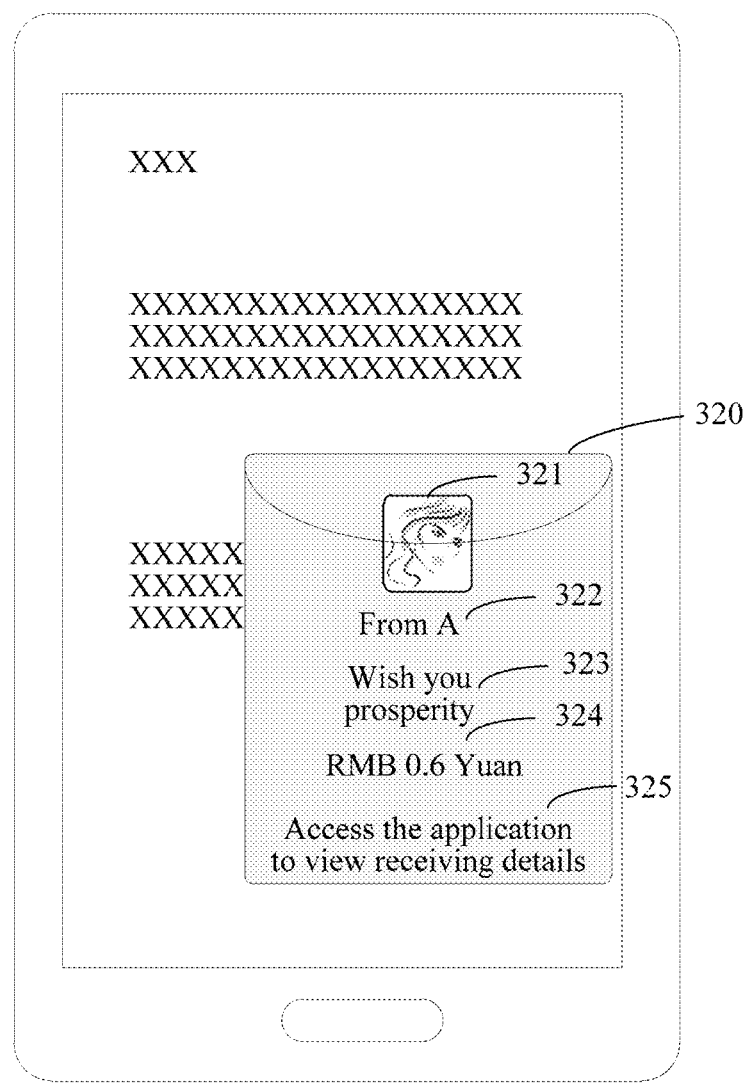
FIG. 8 is a schematic diagram of a media information obtaining success interface according to some embodiments of the present application.

2. When the monetary gift sharing message interface 310 receives a touch operation of a user, a request for obtaining the monetary gift is triggered, so that the server shares the monetary gift according to a monetary gift sharing configuration corresponding to the monetary gift. An amount corresponding to the monetary gift enters an eWallet of a user that currently logs in to the instant messaging application. As shown in FIG. 8, the monetary gift sharing message interface 310 is switched to a monetary gift obtaining success interface 320. The monetary gift obtaining success interface 320 includes a monetary gift sharing user image 321, a monetary gift sharing user name 322, blessing information 323, a monetary gift amount 324, and an interface entry 325 of monetary gift receiving details.

Figure 9:
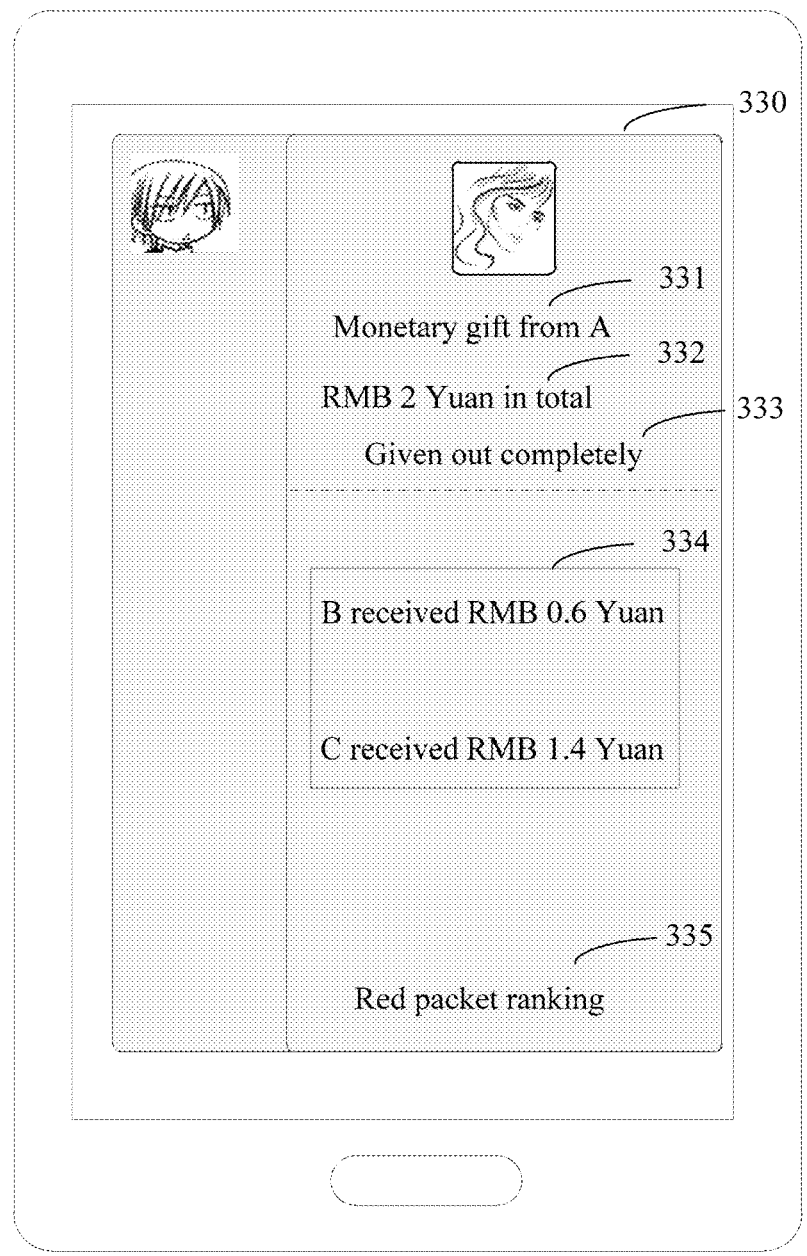
FIG. 9 is a schematic diagram of media information releasing information according to some embodiments of the present application.

3. When the interface entry 325 of the monetary gift receiving details receives a touch operation of the user, the instant messaging application is switched to the foreground for displaying, and a client interface of the instant messaging application is accessed. As shown in FIG. 9, monetary gift receiving details 330 are displayed. The monetary gift receiving details 330 include a monetary gift sharer name 331, a total amount 332 of the monetary gift, a receiving status 333 of the monetary gift, a name of a user receiving the monetary gift and an amount of a corresponding received monetary gift 334, and a monetary gift ranking 335.

Figure 10:
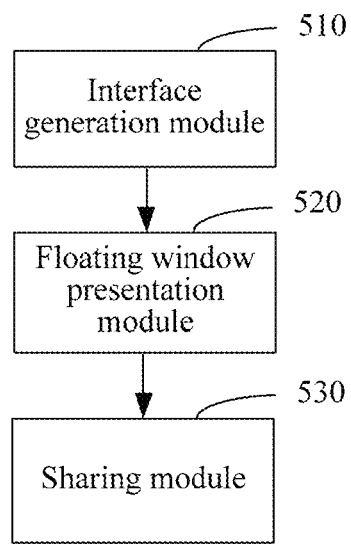
FIG. 10 is a structural block diagram of a media information releasing apparatus according to some embodiments of the present application.

In an embodiment, as shown in FIG. 10, a media information releasing apparatus is provided, including:

an interface generation module 510, configured to: receive a media information releasing message, and generate a media information releasing message interface corresponding to the media information releasing message, the media information releasing message including at least a media information releasing configuration;

a floating window presentation module 520, configured to present, by using a floating window, the media information releasing message interface on a current display interface; and a sharing module 530, configured to obtain a first user operation performed on the media information releasing message interface, the first operation triggering a media information obtaining request, so that a server shares media information according to the media information releasing configuration.

In an embodiment, the interface generation module 510 is further configured to: receive a message, obtain a type identifier of the message, determine whether the type identifier is a media information releasing type, and if yes, determine that the received message is a media information releasing message.

In an embodiment, a media information releasing message is received by using a chat interface of a first application. The first application includes an instant messaging application and/or a social application.

Figure 11:
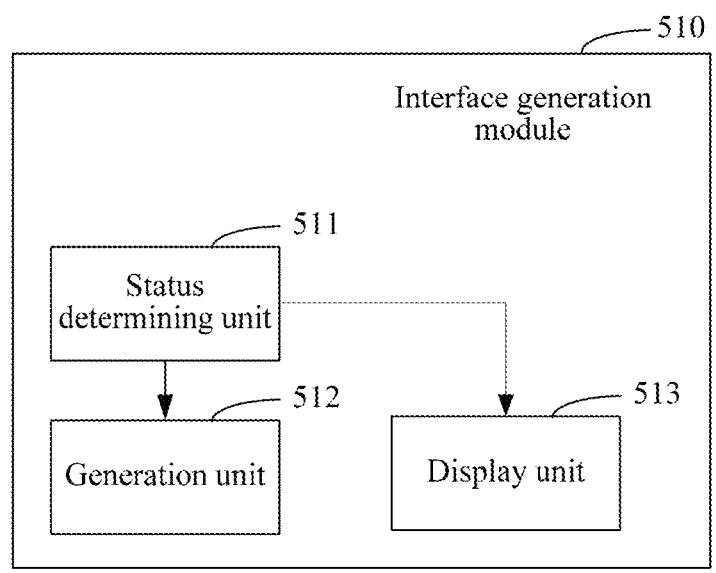
FIG. 11 is a structural block diagram of an interface generation module according to some embodiments of the present application.

In an embodiment, as shown in FIG. 11, the interface generation module 510 includes:

a status determining unit 511, configured to: obtain a source application of the media information releasing message, determine whether the source application is in a background state, and if yes, enter a generation unit, or if not, enter a display unit;

the generation unit 512, configured to generate the media information releasing message interface corresponding to the media information releasing message; and the display unit 513, configured to display a media information releasing body corresponding to the media information releasing message on a message receiving interface of the source application.

In an embodiment, the floating window presentation module 520 is further configured to: obtain a floating window presentation interface provided by a system, transmit content of the media information releasing message interface to the floating window presentation interface, and set a window parameter corresponding to the media information releasing message interface to a mobile phone surface layer type, so that the media information releasing message interface is displayed in front of all current foreground application interfaces.

Figure 12:
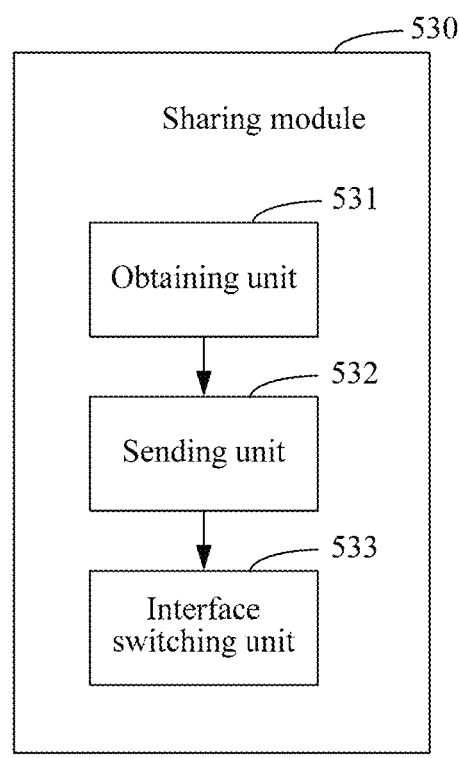
FIG. 12 is a structural block diagram of a sharing module according to some embodiments of the present application.

In an embodiment, as shown in FIG. 12, the sharing module 530 includes:

an obtaining unit 531, configured to: obtain a source application of the media information releasing message, and obtain a user identifier for logging in to the source application and a media information identifier corresponding to the media information releasing message;

a sending unit 532, configured to send a media information obtaining request carrying the user identifier and the media information identifier to a media information server, so that the media information server obtains a corresponding media information releasing configuration according to the media information identifier, and allocates a corresponding media information to the user identifier according to the media information releasing configuration; and an interface switching unit 533, configured to switch the media information releasing message interface to a media information obtaining success interface.

Figure 13:
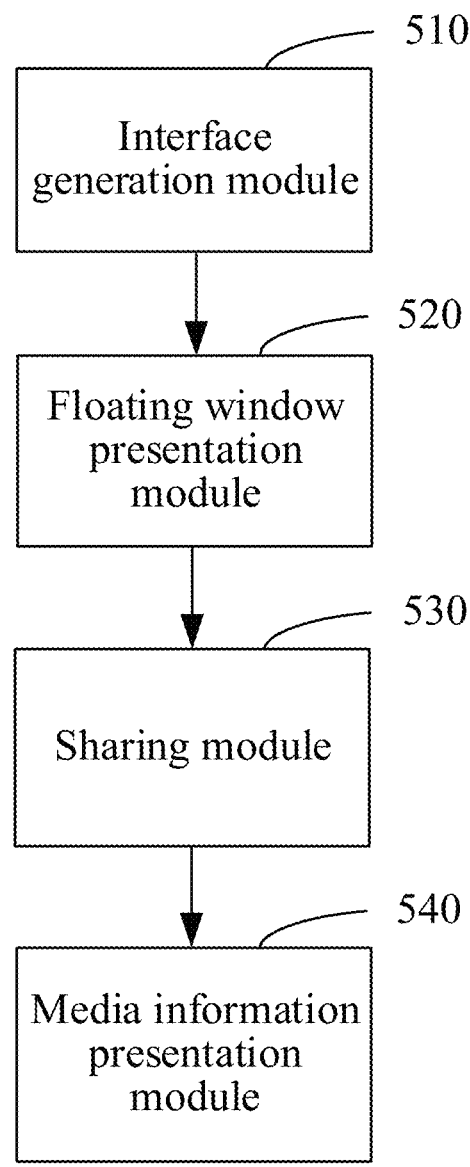
FIG. 13 is a structural block diagram of a media information releasing apparatus according to another embodiment.

In an embodiment, as shown in FIG. 13, the apparatus further includes:

a media information releasing information presentation module 540, configured to: obtain a second operation performed on a media information releasing information entry of the media information obtaining success interface, so that the source application is switched to a foreground, and display media information releasing information on the source application.

Figure 14:
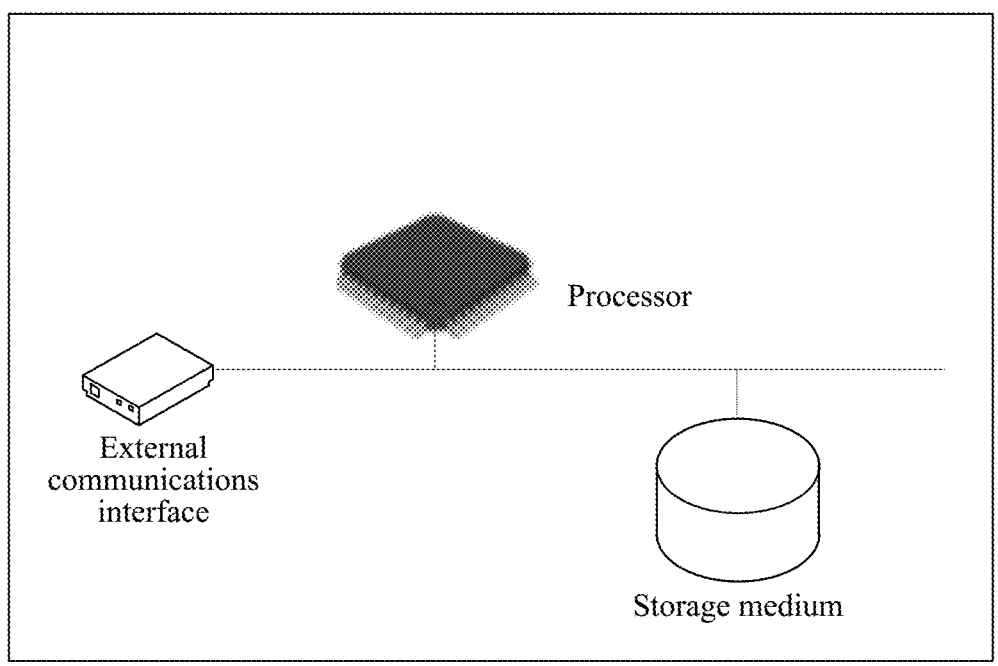
FIG. 14 is a schematic structural diagram of hardware composition of a media information releasing apparatus according to some embodiments of the present application of the present invention.

Based on the foregoing scenario, as an instance of a hardware entity, the apparatus provided in this embodiment is shown in FIG. 14, and includes a processor, a storage medium, and at least one external communications interface. The processor, the storage medium, and the external communications interface are connected by using a bus.

The processor of the apparatus provided in this embodiment of the present invention performs the following processing:

receiving a media information releasing message, and generating a media information releasing message interface corresponding to the media information releasing message, the media information releasing message including at least a media information releasing configuration;

presenting, by using a floating window, the media information releasing message interface on a current display interface; and obtaining a first user operation performed on the media information releasing message interface, the first operation triggering a media information obtaining request, so that a server shares media information according to the media information releasing configuration.

A person of ordinary skill in the art may understand that all or some of the processes in the methods of the foregoing embodiments may be implemented by a computer program instructing relevant hardware. The program may be stored in a non-transitory computer readable storage medium. For example, in the embodiments of the present invention, the program may be stored in a storage medium of a computer system, and is executed by at least one processor in the computer system, to implement the process including the foregoing method embodiments. The storage medium may be a magnetic disk, an optical disc, a read-only memory (ROM), a random access memory (RAM), or the like.

Technical features of the foregoing embodiments may be randomly combined. For brevity of description, not all possible combinations of the technical features of the foregoing embodiments are described. However, as long as combinations of the technical features do not contradict each other, it should be considered that the combinations all fall within the scope recorded in this specification.

The foregoing embodiments are merely several implementations of the present disclosure, which are described in a relatively specific and detailed manner. However, this should not be constructed as a limitation to the scope of the present disclosure. It should be noted that, several modifications and improvements may be made by a person of ordinary skill in the art without departing from the concept of the present disclosure, and all fall within the protection scope of the present disclosure. Therefore, the protection scope of the present disclosure shall be subject to that of the appended claims.

What is claimed is:

1. A gift releasing method performed at a mobile terminal having a display, one or more processors and memory storing a plurality of programs to be executed by the one or more processors, the method comprising:
   receiving an electronic gift releasing message while running a first application at the mobile terminal, wherein the electronic gift releasing message is associated with a second application, distinct from the first application;
   determining whether the first application enables rendering the electronic gift releasing message concurrently with the running of the first application;
   in accordance with a determination that the first application enables rendering the electronic gift releasing message concurrently with the running of the first application:
      generating a first interface corresponding to the electronic gift releasing message via the first application, the electronic gift releasing message comprising at least a gift sharing configuration;
      displaying the first interface as a first floating window on a current display interface on top of the first application;
      obtaining a first user operation performed on the first interface; and
      in response to the first user operation:
         obtaining a user identifier for logging in to the second application and an identifier corresponding to the electronic gift releasing message; and
         sending a gift obtaining request including the user identifier and the identifier corresponding to the electronic gift releasing message to a remote server, wherein the remote server (i) obtains a corresponding gift sharing configuration according to the identifier and (ii) transfers a corresponding electronic gift to the user identifier at the second application according to the gift sharing configuration;
      replacing the first interface with a second interface, the second interface indicating that the gift obtaining request was successful; and
      displaying the second interface as a second floating window at a different location from the first floating window on the current display interface on top of the first application, including displaying a name of the electronic gift, an amount of the electronic gift, a receiving status of the electronic gift and a link to access a user account corresponding to the user identifier at the second application.

2. The method according to claim 1, further comprising:
   in accordance with a determination that the first application does not enable rendering the gift releasing message:
      generating a system notification of the second application for the electronic gift releasing message; and
      presenting a visual indicator corresponding to the system notification on the current display interface of the first application;
      obtaining a second user operation performed on the visual indicator; and
      in response to the second user operation, replacing the current display interface of the first application with a system notification interface including the system notification for the electronic gift releasing message.

3. The method according to claim 1, wherein the first application is a web browser application and the second application is an instant messaging application.

4. The method according to claim 1, wherein receiving the electronic gift releasing message comprises:
   receiving a message;
   obtaining a type identifier of the messaged;
   determining whether the type identifier is an electronic gift releasing type; and
   in accordance with a determination that the type identifier is an electronic gift releasing type, determining that the received message is a electronic gift releasing message.

5. The method according to claim 1, wherein displaying the first interface as a floating window on a current display interface on top of the first application comprises:
   obtaining a floating window presentation interface provided by a system, and transmitting content of the first interface to the floating window presentation interface; and
   setting a window parameter corresponding to the first interface to a mobile phone surface layer type, so that the first interface is displayed in front of all current foreground application interfaces.

6. The method according to claim 1, further comprising:
   obtaining a second user operation performed on the second interface;
   in response to the second user operation:
      switching the second application to a foreground such that the second application occupies an entire area of the display, and
      displaying the gift releasing information on the second application.

7. A mobile terminal for gift releasing, the mobile terminal comprising a display, one or more processors, memory coupled to the one or more processors, and a plurality of programs stored in the memory that, when executed by the one or more processors, cause the mobile terminal to perform operations including:

receiving an electronic gift releasing message while running a first application at the mobile terminal, wherein the electronic gift releasing message is associated with a second application, distinct from the first application;

determining whether the first application enables rendering the electronic gift releasing message concurrently with the running of the first application;

in accordance with a determination that the first application enables rendering the electronic gift releasing message concurrently with the running of the first application:

generating a first interface corresponding to the electronic gift releasing message via the first application, the electronic gift releasing message comprising at least a gift sharing configuration;

displaying the first interface as a first floating window on a current display interface on top of the first application;

obtaining a first user operation performed on the first interface; and in response to the first user operation:

obtaining a user identifier for logging in to the second application and an identifier corresponding to the electronic gift releasing message; and sending a gift obtaining request including the user identifier and the identifier corresponding to the electronic gift releasing message to a remote server, wherein the remote server (i) obtains a corresponding gift sharing configuration according to the identifier and (ii) transfers a corresponding electronic gift to the user identifier at the second application according to the gift sharing configuration;

replacing the first interface with a second interface, the second interface indicating that the gift obtaining request was successful; and displaying the second interface as a second floating window at a different location from the first floating window on the current display interface on top of the first application, including displaying a name of the electronic gift, an amount of the electronic gift, a receiving status of the electronic gift and a link to access a user account corresponding to the user identifier at the second application.

8. The mobile terminal according to claim 7, wherein the operations further comprise:

in accordance with a determination that the first application does not enable rendering the media information releasing message:

generating a system notification of the second application for the electronic gift releasing message; and presenting a visual indicator corresponding to the system notification on the current display interface of the first application;

obtaining a second user operation performed on the visual indicator; and in response to the second user operation, replacing the current display interface of the first application with a system notification interface including the system notification for the electronic gift releasing message.

9. The mobile terminal according to claim 7, wherein the first application is a web browser application and the second application is an instant messaging application.

10. The mobile terminal according to claim 7, wherein the operation of receiving an electronic information releasing message comprises:

receiving a message;

obtaining a type identifier of the message;

determining whether the type identifier is an electronic gift releasing type; and in accordance with a determination that the type identifier is an electronic gift releasing type, determining that the received message is a electronic gift releasing message.

11. The mobile terminal according to claim 7, wherein displaying the first interface as a floating window on a current display interface on top of the first application comprises:

obtaining a floating window presentation interface provided by a system, and transmitting content of the first interface to the floating window presentation interface; and setting a window parameter corresponding to the first interface to a mobile phone surface layer type, so that the first interface is displayed in front of all current foreground application interfaces.

12. The mobile terminal according to claim 7, the operations further comprising:

obtaining a second operation performed on the second interface;

in response to the second user operation:

switching the second application to a foreground such that the second application occupies an entire area of the display; and displaying the gift releasing information on the second application.

13. A non-transitory computer readable storage medium storing a plurality of programs that, when executed by one or more processors of a mobile terminal comprising a display, cause the mobile terminal to perform operations including:

receiving an electronic gift releasing message while running a first application at the mobile terminal, wherein the electronic gift releasing message is associated with a second application, distinct from the first application;

determining whether the first application enables rendering the electronic gift releasing message concurrently with the running of the first application;

in accordance with a determination that the first application enables rendering the electronic gift releasing message concurrently with the running of the first application:

generating a first interface corresponding to the electronic gift releasing message via the first application, the electronic gift releasing message comprising at least a gift sharing configuration;

displaying the first interface as a first floating window on a current display interface on top of the first application;

obtaining a first user operation performed on the first interface; and in response to the first user operation:

obtaining a user identifier for logging in to the second application and an identifier corresponding to the electronic gift releasing message; and sending a gift obtaining request including the user identifier and the identifier corresponding to the electronic gift releasing message to a remote server, wherein the remote server (i) obtains a corresponding gift sharing configuration according to the identifier and (ii) transfers a corresponding electronic gift to the user identifier at the second application according to the gift sharing configuration;

replacing the first interface with a second interface, the second interface indicating that the gift obtaining request was successful; and displaying the second interface as a second floating window at a different location from the first floating window on the current display interface on top of the first application, including displaying a name of the electronic gift, an amount of the electronic gift, a receiving status of the electronic gift and a link to access a user account corresponding to the user identifier at the second application.

14. The non-transitory computer readable storage medium according to claim 13, wherein the operations further comprise:

in accordance with a determination that the first application does not enable rendering the media information releasing message:

generating a system notification of the second application for the electronic gift releasing message; and presenting a visual indicator corresponding to the system notification on the current display interface of the first application;

obtaining a second user operation performed on the visual indicator; and in response to the second user operation, replacing the current display interface of the first application with a system notification interface including the system notification for the electronic gift releasing message.

* * * * *